Aug. 2, 1949.  W. T. STEPHENS  2,477,669
CONTROL VALVE FOR DOUBLE-ACTING
HYDRAULIC SYSTEMS

Filed Aug. 18, 1944  5 Sheets-Sheet 1

Inventor
WILLIAM T. STEPHENS

By
Leech & Radue
Attorney

Patented Aug. 2, 1949

2,477,669

UNITED STATES PATENT OFFICE 2,477,669

CONTROL VALVE FOR DOUBLE-ACTING HYDRAULIC SYSTEMS

William T. Stephens, Cleveland, Ohio, assignor, by mesne assignments, to Hydraulic Equipment Company, Cleveland, Ohio, a corporation of Ohio Application August 18, 1944, Serial No. 550,078

17 Claims. (Cl. 60—52)

This invention relates to control valves for double acting hydraulic systems and more particularly to such valves equipped with automatic means to insure complete control of hydraulic rams or hoists on both raising and lowering operations.

It is a general object of the present invention to provide novel and improved control valves for double acting hydraulic systems.

More particularly it is an object of the present invention to provide hydraulic control valves for double acting hydraulic control systems adapted for use with either the open or closed system of control and in either case to insure against undesired movement of the hoist, on its lowering operation, due to the action of the load and independent of the rate of supply of the liquid causing the lowering operation.

As an important feature of one embodiment of the invention there is provided means for operating the system in the closed manner during movements of the hoist in either direction and for automatically converting to the open system at all other times.

Another important feature of the invention resides in the novel construction and arrangement of return liquid flow control valves for use with the open system, which valves under the regulation of pressure from the pump, control the rate of return of liquid from the hoist to the tank.

A further important feature of the invention resides in the provision of a flow control valve for use with closed systems which not only provides for the automatic conversion to the open system when hoisting is not taking place, but which provides for an adequate supply of liquid to the pump inlet under all conditions and for relief of excess liquid in the case of differential volumes becoming available from the two ends of the hoist.

Among the essential features of the invention which contribute to its simplicity of construction and operation is the incorporation in the manual control valve of a single check valve automatically operable on both hoisting and lowering operations to insure against return of fluid from the hoist toward the pump.

Other features and objects of the invention include the simplicity of the valve housing structure, the arrangement and disposition of the main and auxiliary valve parts, the construction of the valve plungers, their ports and passages, and means providing, in the several embodiments, for handling differential volumes of fluid from the two ends of the hoist when the control valve is in the float position.

Other and further objects and features of the invention will be more apparent to those skilled in the art upon a consideration of the accompanying drawings and the following specification wherein are disclosed several exemplary embodiments of the invention, it being understood that such changes, modifications and combinations of the several figures may be made as fall within the scope of the appended claims without departing from the spirit of the invention.

In the operation of double acting hydraulic devices such as rams, hoists and the like, conditions arise, dependent upon connected mechanical apparatus, necessitating extremely accurate control of the position of the piston, together with some means to prevent movement of the piston out of control of the hydraulic liquid as, for instance, under the operation or weight of the load when the latter is being lowered.

The present invention deals primarily with a valve intended for the control of the hydraulic cylinder or hoist used for the manipulation of the blade on a bulldozer or grader, but is not to be construed as so limited, since it is capable of use in a wide variety of fields. The description, however, for the sake of convenience, will refer to the preferred use of the apparatus.

In the operation of a bulldozer for grading or similar earth handling manipulations, it is desired that the blade may be raised, held, lowered or permitted to float, under the instant and accurate control of the operator. Difficulties have heretofore been experienced in equipment of this sort when attempts were made to lower the blade. Its considerable weight tends to withdraw the piston from the liquid following it and intended to regulate its rate of lowering on release of the liquid supporting the piston. This provides erratic operation and prevents the attainment of the fine grading which can be achieved with machines of this type provided with proper controls.

Heretofore two general systems have been used in an endeavor to overcome the above mentioned difficulty. The first of these is the use of the so-called "closed" system wherein the positive displacement pump for circulating the pressure liquid is connected to receive its supply of liquid from one end of the hoist cylinder while delivering to the opposite end. This prevents uncontrolled travel of the piston under the weight of the blade since liquid is withdrawn only as fast as delivered, but this system circulates such a small quantity of liquid that overheating is prevalent, particularly in the neutral or hold position, when fluid is merely circulated from the pump to the valve and back. The tank or reservoir serves only to provide reserve liquid and to take care of a differential in displacement at the two ends of the cylinder, one of which is occupied by a piston rod.

In the other or so-called "open" system, liquid is delivered from the high pressure side of the pump to operate the hoist on the lift stroke and fluid is returned to the tank from the opposite end of the hoist. The pump inlet is from the tank. Upon the lowering stroke some form of flow control valve is provided to limit the rate at which the liquid can be returned to the tank from the hoist in an endeavor to prevent the piston leaving the liquid in the upper side of the cylinder. Such flow control valves have not been wholly satisfactory because they were not constructed to regulate the rate of flow in accordance with the proper requirements. This system is not subject to serious overheating since the pump at all times takes its liquid from the large supply tank where cooling is adequate.

In accordance with the present invention improvements are made in both systems. In the first or closed system, operation when hoisting or lowering is in the normal closed system manner with the two ends of the hoist being connected to the two sides of the pump whereby overrunning is prevented. However, in the hold or neutral position, the system is converted automatically to an open one and the pump circulates liquid from and to the tank, thus preventing overheating during by far the longest periods of normal operation. In the open system an improved type of flow control valve, subject to being positioned by the high pressure from the pump outlet, is provided.

In both cases material simplification of the valve housing structure is achieved by providing the check valve, which prevents return of high pressure liquid from the cylinder toward the pump, within a bore which is provided longitudinally of and in the valve plunger, which bore likewise permits the high pressure fluid to by-pass certain of the control grooves in the plunger surface between the lands thereon. This single check valve serves when supplying high pressure fluid to either end of the hoist.

Figure 1:
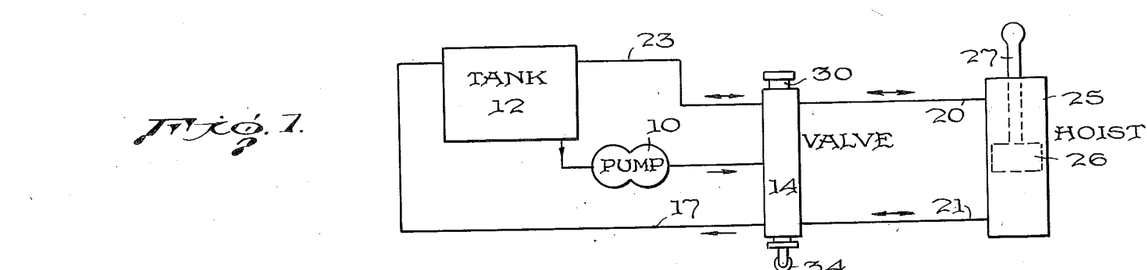
Figure 1 is a schematic and diagrammatic representation of a hydraulic control system for the operation of a double acting hoist or ram by the so-called open circuit system.
Figure 2:
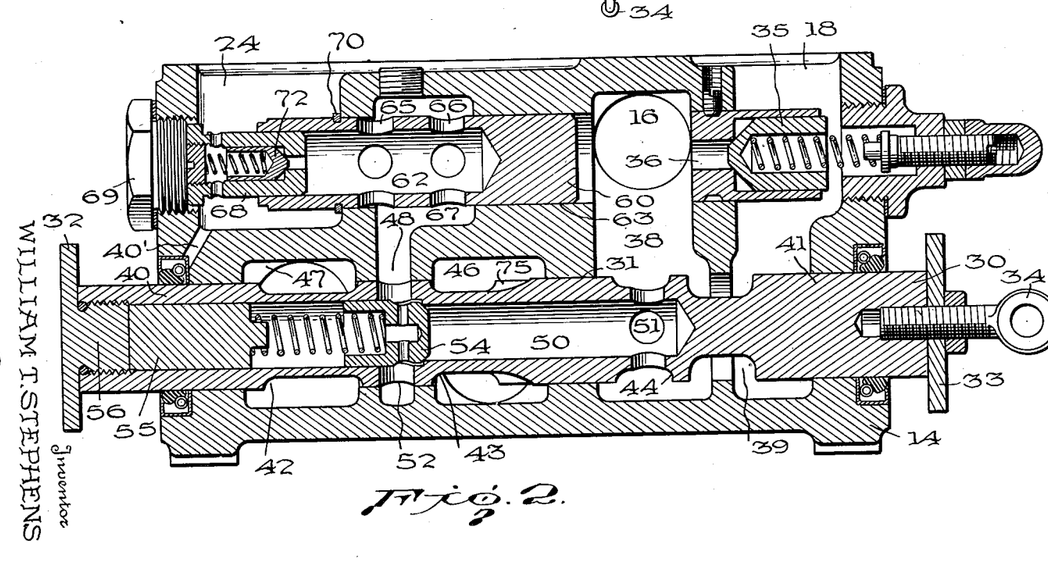
Figure 2 is a longitudinal central section through a control valve adapted for use with a system of the type illustrated in Figure 1.

Referring now to Figures 1 and 2 of the drawing, there is illustrated an "open system" for hoist operation together with details of a valve for controlling the hoist. The system as shown in Figure 1 is substantially conventional; including the positive displacement pump 10, usually of the gear type, receiving its liquid supply from the reservoir or tank 12 and delivering it to the housing 14 of the control valve, which housing is shown more completely in Figure 2 as comprising a casing containing certain passages, ports, plungers and the like. It receives high pressure fluid from the pump into the port 16 from a suitable piping connection. When the valve is in the neutral position, which will be later described, liquid is returned to the tank through pipe 17 by way of low pressure passage 18 in the valve housing. When the valve is set to operate the hoist in either direction, fluid is delivered directly from the pump through the valve to one of the pipes 20 or 21 leading to the appropriate end of the hoist. Fluid from the other end of the hoist is returned to the tank through the proper pipe to the valve and by way of pipe 23 from discharge passage 24 in the valve housing. The hoist cylinder 25 will be seen to house a piston 26 having a piston rod 27 at one end. It will be noted then that more liquid is required to be delivered beneath the piston, to lift the same, than is taken out from above the piston, and vice versa. The valve provides means to compensate for this, as will later appear.

For the sake of convenience and for reducing the quantity of piping in the space occupied by the hydraulic equipment, the valve, as shown, is intended to be mounted directly beneath the tank and to have ports in the bottom wall of the same cooperating with the passages 18 and 24 just described. The valve, however, by the provision of proper piping connections, may be mounted independently of the tank, as will be appreciated.

Manual control of the operation of the hoist is effected by appropriate movement of the cylindrical valve plunger 30 arranged in and passing through bore 31 in the housing. The ends of the plunger are fitted with stop flanges 32 and 33, one of which is positioned by means of the manipulative eye 34. The valve is shown in the neutral or hold position, which locks the hoist plunger wherever it may be positioned at the time, serving thereby to hold the bulldozer blade in a fixed position against dislodgement.

Figure 5:
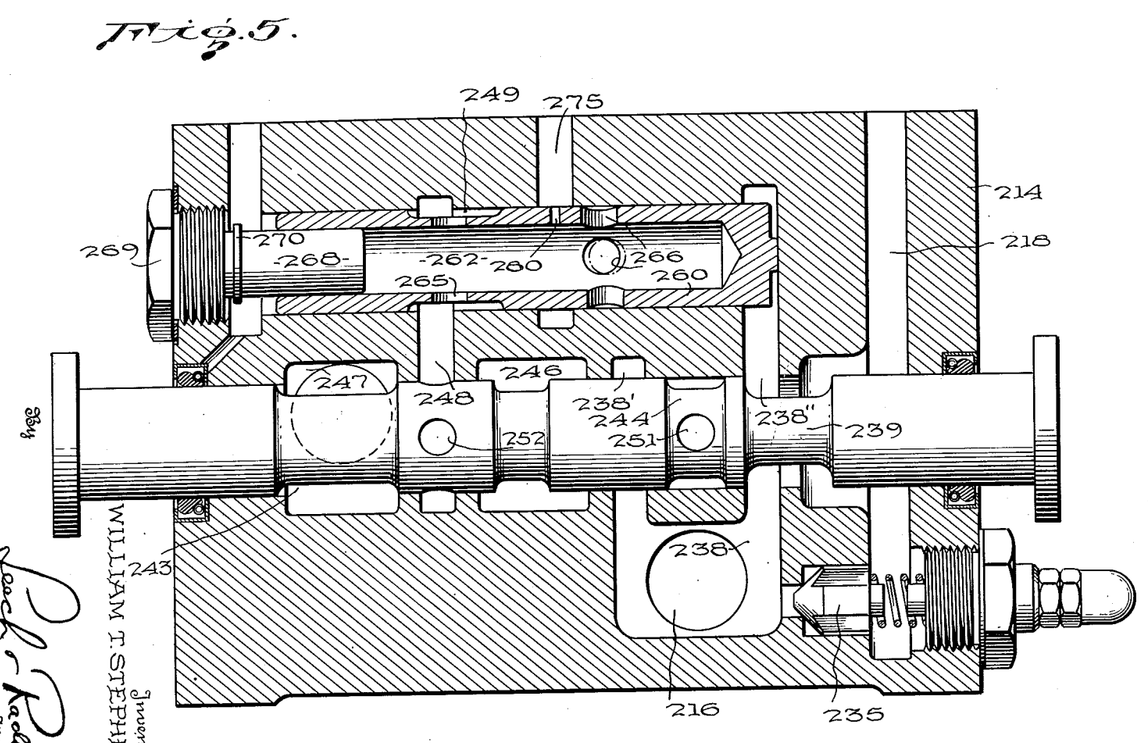
Figures 5 and 6 are longitudinal central sections through modified types of valves adapted for use with the open type of system illustrated in Figure 1, the only differences in the devices of the two figures being in the flow control or diverting valves.

When moved to the left the plunger 30 provides appropriate connections to raise the hoist, which operation will continue so long as the valve is so positioned, until maximum stroke is achieved, whereupon excess pressure then developed by the pump is vented to passage 18 by movement of the high pressure relief valve 35 which controls the passage 36 between the high pressure inlet 16 and the low pressure outlet passage 18. The valve is of non-circular cross-section as seen in Figure 5. An appropriate spring and adjusting mechanism is shown for determining the pressure at which this relief valve functions.

In the neutral position high pressure fluid from inlet 16 flows through passage 38 which intersects bore 31 and passes through grooves 39 in the surface of the valve plunger and enters the chamber 18 to be returned to the tank. This permits the pump to circulate the liquid between itself and the tank for adequate cooling.

When the valve plunger is moved to the right a part of the maximum distance it permits lowering of the hoist, and the operation is identical with the lift previously described. Further movement to the right to the maximum position places the valve in the so-called "float" position connecting opposite sides of the hoist to each other, whereby the blade of the bulldozer is free to move up and down as determined by the condition of the terrain.

The valve plunger 30 previously referred to, is a cylindrical rod having a close fit in the bore 31 by all portions of its surface not interrupted by ports or grooves. The full diameter portions are termed "lands" and there is one numbered 40 at the left end, one numbered 41 at the right end and several intermediate ones. The surface of the plunger is also provided with circumferential grooves 42, 43, 44 and 39, each of which has at least the function of spanning and thus connecting certain passages in the valve housing. In addition to the passages 18 and 38 already defined, there is the lowering passage 46, the hoist passage 47 and the discharge passage 48. The first two, 46 and 47, as will be appreciated, are appropriately connected by piping to the respective ends of the hoist, while 48 may be connected, in a regulated degree to the passage 24 leading to the tank, by a flow control valve which will later be described.

The main valve plunger is drilled from the left end to provide a central passage or bore 50 ported at 51 to the groove 44 and ported at 52 to the surface of the land intermediate grooves 42 and 43. A check valve 54 is spring pressed closed and prevents liquid movement from 52 toward 51 but not in the opposite direction. The spring chamber behind the valve is closed by plug 55 positioned by a screw portion 56 on flange 32. Proper venting of the plunger of the check valve, as shown, prevents fluid lock.

When the valve is moved to the left, the land 41 closes the port between passages 38 and 18 so that the high pressure fluid from the pump is no longer returned to the tank. This high pressure fluid now enters ports 51 by way of groove 44, passes through passage 50, lifts check valve 54, flows out through ports 52 into passage 47 now registering therewith and passes to the underside of the piston of the hoist. Groove 43 has been moved to span passages 46 and 48 so that fluid returning from the upper side of the hoist by way of 46 is delivered into 48 to be returned to the tank.

If this returning liquid is not restricted in its flow the hoist might be moved by its load if applied in the proper direction and prevent the accurate control desired, so that a flow control valve 60 is interposed between passages 48 and 24. This valve comprises a hollow plunger closed at the right hand and exposed there to the high pressure in passage 16 from the pump. Its opposite end is drilled to provide a chamber 62. The valve moves in a bore 63 parallel to the bore of the main plunger and has two spaced sets of ports 65 and 66 both open, in the position shown, to the enlarged end 67 of the passage 48. Under these conditions no fluid can be returned from the hoist. If fluid is thus prevented from being returned from the hoist, then the pressure on the opposite side of the hoist piston increases and is reflected in the passage 16. Such an increase in the pressure being against the end of valve plunger 60 moves it toward the left, exposing more or less of bores 65 in the passage 24 so that the return fluid from the hoist enters the regulating valve through its ports 66 and leaves through ports 65. Any tendency for this liquid to move too rapidly, due to undesired movement of the hoist piston, reduces the pressure at the pump outlet and the flow control valve moves toward the right, as later described, checking the flow of waste from the hoist. Under these conditions an optimum or balanced condition of the flow control valve is achieved to insure that the hoist piston move only so rapidly as fluid is being supplied behind it from the delivery side of the pump.

It will be seen that the left hand end of the bore 62 in the flow control valve plunger 60 is closed by a freely sliding plug 68, which has its left end enlarged to a head normally forced against the inner end of the plug 69 by pressure within the chamber of this valve, which return pressure is responsible for normally moving the valve plunger to the right against the pressure from passage 16. Movement of this plunger to the right is limited by engagement of stop ring 70 with the right hand wall of passage 24. In the normal operation of the valve the return flow from the hoist is entirely controlled by the rate of flow of the entrance fluid to the hoist and the pressure of this fluid is determined by the load and its direction of force.

The flow control valve has but little function when the hoist is actually lifting a load since then the pressure is high at 16 and overcomes the lower return pressure in the chamber 62 holding plunger 60 to the left. On the lowering operation, however, which results from moving the control valve plunger to the first position to the right from that illustrated, this valve is important. With the control valve plunger moved to the lowering position, the land to the right of groove 44 closes the connection between high pressure passage 38 and low pressure passage 18 so that high pressure oil flows into ports 51, through check valve 54 and out through ports 52 into the passage 46, delivering to the top side of the hoist. Liquid returning from the lower side of the hoist enters passage 47, flows through groove 42 into passage 48 and then through ports 66 to the interior of the flow control valve where it acts exactly as previously described, permitting a balance to be achieved between the reduced high pressure from the pump, which now has no real work to do, acting on the right face of the plunger and the low pressure acting on the inner face and on the face of the plug 68. The load on the hoist produces a pressure on the exhaust oil which is transmitted to the interior of the flow control valve, tending to keep the same toward the extreme right, thus preventing flow of the exhaust oil back to the tank and insuring against the hoist acting ahead of the pump. No return flow of oil will take place until sufficient pressure has been built up on the lowering or top side of the hoist to force the plunger 60 to the left against the action of the oil in its chamber 62. This serves to uncover ports 65 to return passage 24 and start the flow of released oil, producing a pressure drop in 16 so that the plunger 60 moves slightly to the right until a balance is achieved.

Under ordinary operating conditions the small amount of oil in chamber 62 which is displaced by movement of the plunger 60 will be forced into the exhausting side of the hoist, but if the hoist should be in either of its extreme positions this action could not take place, so that plug 68 is provided with a relief valve plunger 72. If, with this construction, the oil cannot get in the exhaust side of the hoist, pressure will be built up in the chamber 62 until the relief valve 72 is lifted, allowing a small quantity of oil to be discharged back to the tank via passage 24. Thereafter the flow control valve will function in its normal manner. The relief valve plunger 72 is set to operate at a pressure higher than that required to hold the load but at a pressure lower than the maximum required for raising.

When the valve plunger 30 is pulled to its maximum position to the right, the "float" condition occurs and groove 44 spans passages 38 and 18 permitting the pump to freely deliver fluid to the tank. Groove 42 spans recesses 46, 47 and 48. This connects the hoist passages to each other so that the piston thereof is free to be moved under the action of its load in either direction. Since there is a differential in the volume of the two ends of the hoist cylinder the multiple longitudinal grooves 75 are provided at the right end of groove 43 and they serve to span passages 46 and 38. Oil may be taken from or delivered to this passage 38 in accordance with requirements from passage 46 which is now connected to the other hoist passage 48.

Figure 3:
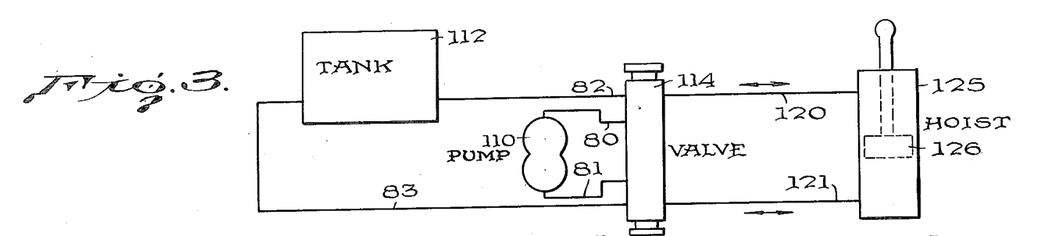
Figure 3 is a view similar to Figure 1 illustrating a closed circuit system.
Figure 4:
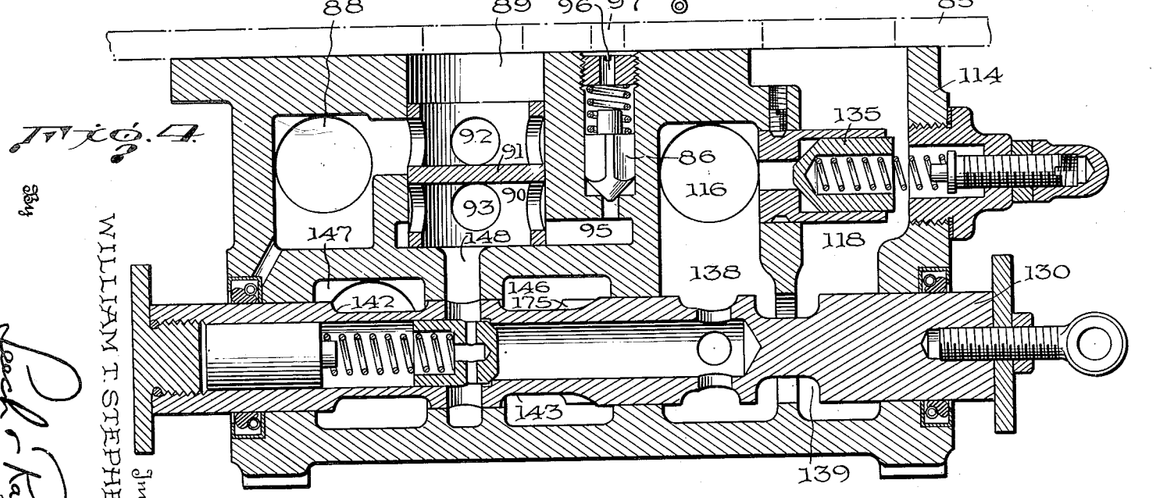
Figure 4 is a longitudinal central section through a preferred form of control valve for use with a system of the type illustrated in Figure 3.

In Figures 3 and 4 is illustrated a closed system of hydraulic hoist control, together with a suitable control valve for the operation of the same. Wherever possible reference characters similar to those used in Figures 1 and 2, plus 100, will be used to indicate corresponding parts. The system includes the hoist or ram 125 having the piston 126 controlled by valve 114 serving to connect the pump 110 to appropriate sides of the hoist to move it in the desired direction. Pipes 120 and 121 connect the valve to the opposite ends of the hoist, as in Figure 1, but the pump has two connections thereto, 80 and 81. Likewise the tank 112 is connected through piping 82 to one side of the valve and through pipe 83 to the other side and has no direct connection to the pump except through the valve.

The valve housing shown in Figure 4 is adapted to be mounted beneath the bottom 85 of a tank as described in connection with Figure 2 and a portion of the tank bottom is illustrated with openings to correspond to those in the top wall of the valve housing. This housing is not substantially different from that illustrated in Figure 2 and is equipped with an identical control valve plunger 130. Likewise this housing is equipped with a high pressure inlet 116 from the pump, supplying the passage 138; with a low pressure outlet to the tank comprising the passage 118; with a lowering hoist passage 146 and a raising hoist passage 147. These together with the discharge passage 148 all intersect the bore for the control valve plunger as previously described and are adapted to be connected in the same manner by the various grooves and ports in the valve plunger.

The hoist is equipped with the high pressure relief valve 135 identical with that in the earlier form. Here it may be noted that this valve plunger is non-circular in cross-section so that it provides for fluid discharge as soon as it is moved at all from the seat. In elevation this plunger appears like the low pressure plunger 86 shown just to the left of the high pressure inlet from the pump.

Since in the closed system the pump inlet is supplied from the discharge from the hoist, the discharge passage 148 is adapted to be connected to either of the hoist passages 146 or 147 and delivers in a manner to be later described to the low pressure outlet port 88 connected directly to the pump inlet. Control of the delivery of fluid to the pump must be such that this system operates as an open system when the control valve is in the neutral or hold position illustrated, for then the pump delivers high pressure through 116 to 138 through the grooves 139 in the plunger into the low pressure discharge passage 118 back to the tank. The pump must then be able to take liquid from the tank for circulation to maintain adequate cooling during idling periods. For this purpose a cylindrical vertical bore 89 forms an extension to the passage 148 and has its upper end open to the tank. Reciprocably mounted in this bore 89 is a valve member 90 comprising a close fitting cylindrical sleeve open at the ends and containing a central partition 91. Above the partition it is provided with lateral ports 92, below with corresponding lateral ports 93. The open bottom of this valve is arranged to receive return liquid from the hoist directly from the passage 148 in accordance with the position of the control valve.

With the flow control valve 90 in its lower position, as illustrated, fluid cannot escape through ports 93, which are closed off by walls of the bore in which the valve operates. In this position the valve provides direct passage for liquid from the tank into the open upper end of the valve and out through ports 92 into the low pressure passage 88 delivering to the pump. When the manual control valve plunger is set to move the hoist in either direction the discharge from the opposite end of the latter coming from passage 146 or 147 is delivered from the appropriate groove in the plunger into discharge passage 148 and flows into lower side of the flow control valve 90, building up a pressure therein sufficient to lift the valve against the very small pressure produced by the head of the liquid in the tank. Upward movement of the valve is limited by the underside of the tank wall and under these conditions the return fluid from the hoist discharges through ports 93 to 88 and supplies the pump.

If the control valve is set to the raise position the quantity of liquid being received from the upper portion of the hoist is less than that being delivered by the pump, because of the volume occupied by the piston rod. Under these conditions the pump inlet takes away liquid faster than it is being delivered through ports 93, thus reducing pressure on the underside of valve 90, permitting it to lower sufficiently to partially uncover ports 92, which provide make-up liquid direct from the tank to compensate for the differential volume on the two sides of the hoist piston.

On the reverse operation, i. e., lowering of the hoist, more fluid is being delivered beneath the now elevated flow control valve 90 than is being taken by the pump for delivery to the upper side of the hoist. This extra quantity of liquid builds up a pressure beneath valve 90 which acts on low pressure relief valve 86 through its passage 95, which is exposed when the skirt of the flow control valve is lifted. This permits adequate fluid relief to the tank through passages 96 and 97. The low pressure relief valve 86 is normally maintained closed by a light adjustable spring, as shown.

It will be seen that the flow control valve automatically provides compensation for the difference in volume of oil handled from the two sides of the hoist piston. It is also responsible for transferring the sysem from an open one when the control valve is in the neutral or hold position to a closed one when the hoist is being operated. The operation of the hoist by a closed system insures against the piston moving away from the body of oil which is attempting to lower the load, due to the latter trying to advance more rapidly, due to its weight, than the moving fluid. It is obvious that the tension on the spring controlling the low pressure relief valve 86 must be such that the hoist cannot fall of its own accord but must be forced down by the delivery of a lesser quantity of fluid to the upper side of the piston. A few pounds differential is adequate, which serves to relieve the pump of any substantial work during the lowering operation.

In all other respects except the differences defined above this valve functions as described in connection with Figure 2, providing the customary float postion where transfer of liquid between the two sides of the hoist is effected through the bridging of groove 142 across passages 146 and 147, and the provision of the longitudinal grooves 175 connecting passage 146 with 138 for making up or discharging to compensate for unequal volumes of liquid on the two sides of the hoist piston.

Figure 6:
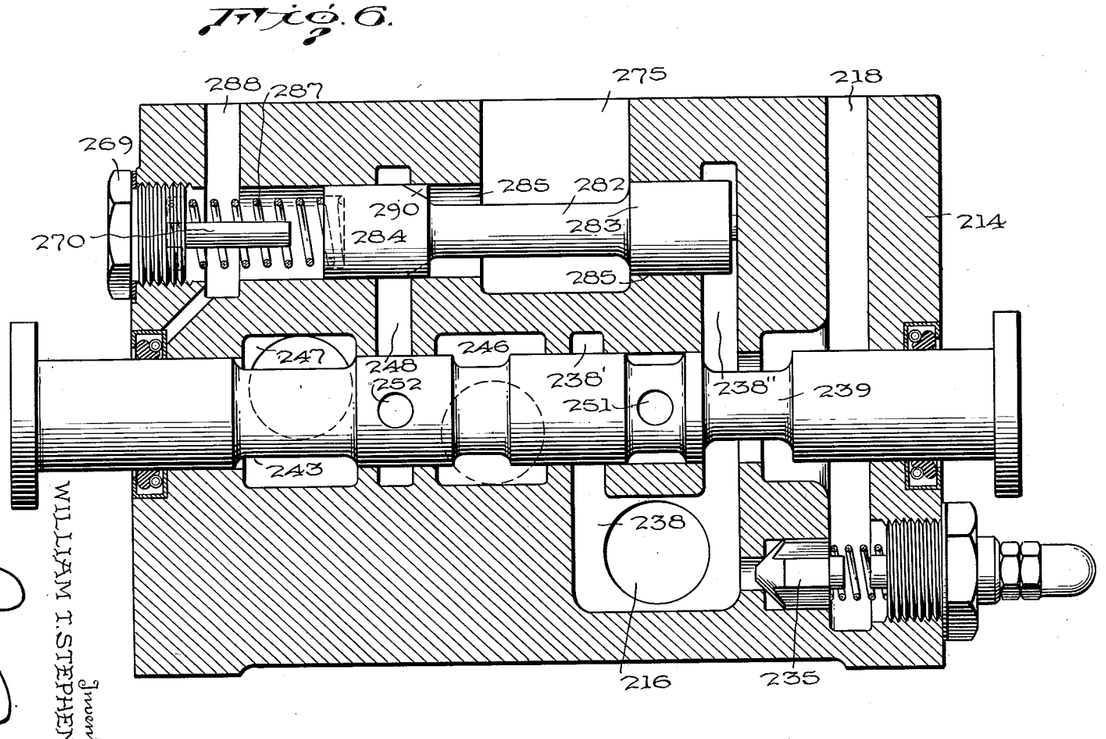

In Figures 5 and 6 are illustrated two embodiments of a modified form of valve for use with the open system of Figure 1. These two embodiments differ only in the construction of the flow control valve for limiting the rate at which the liquid is returned from the hoist to the tank so that lowering is positively controlled at all times.

In theses two figures the valve body 214 has its ports and passages arranged somewhat differently from those illustrated previously. The high pressure liquid from the pump is delivered through port 216 into a passage 238 having a branch 238' intersecting the valve plunger bore to the left of the plunger groove 244 in the bottom of which are the high pressure entrance ports 251, and a second branch 238" to the right of this groove 244, when the plunger is in the neutral position. It is this second branch which is opened to the low pressure discharge passage 218 by virtue of the groove 239 when the plunger is in the neutral position.

Although the plunger has a slightly different arrangement of grooves it has the same number as on the plungers of Figures 2 and 4 and is equipped in an identical manner with a check valve, not shown.

In operation the neutral position of the valve provides the same performance as takes place in connection with Figure 2, fluid entering through 216 into 238 and 238", passing through groove 239 and back to the tank by way of 218 providing a free passage of liquid between the pump and the tank. A high pressure relief valve which may be similar or identical in construction to that disclosed at 35 in Figure 2 is provided at 235 in a corresponding position with respect to the high pressure inlet from the pump and discharges into passage 218 for returning liquid to the tank.

When the control plunger is positioned to register the high pressure outlet port 252 in the valve plunger with either of the raise or lower "hoist passages" 246 and 247 in the valve body, fluid is delivered to the appropriate side of the hoist as previously described and is returned from the other side for delivery into discharge passage 248 through the proper connecting groove in the valve plunger. From 248 fluid flows into an enlarged chamber 249, Figure 5, which is in reality a groove in the wall of a cylindrical flow control valve 260 having its right hand end exposed in high pressure chamber 238" and its left hand end closed by a loose sliding plug 268 normally abutting against the screw plug 269 and limited in its right hand movement by a stop ring 270 engageable with the left end of the hollow valve 260. In the absesnce of pressure from the pump the flow control valve 260 will assume the position illustrated due to pressure of return liquid in its chamber 262, to which it can flow in any position of the flow control valve through ports 265 opening into chamber 249. Any resistance to liquid returning from the hoist will immediately cause a buildup in the pump pressure and this acting on the right end of the plunger 260 moves it toward the left until one or more of the staggered ports 266 cooperates with the return passage 275 which leads back to the tank. Accurate control is permitted because of the staggered relation of the port so that throttling of the return fluid is in the exact rate at which the pump supplies high pressure fluid to the opposite side of the hoist to permit accurate control of its return or lowering.

When the control valve is adjusted to place the plunger in the float position, the passage 243 spans passages 246, 247 and 248, thus connecting the two sides of the hoist together and to the passage 248. If the valve plunger 260 should happen to be in its left hand position due to high pressure in 238" or low pressure within its chamber, then any excess fluid from the "lift" side of the hoist which cannot be returned to the "lower" side thereof will be discharged into the tank through 266 and 275, but if for some reason the piston 260 is in the position illustrated, then the small bleeder port 280 provides for this relief. During the movement of the hoist in the opposite direction on "float," the added quantity of liquid required by the lower portion of the hoist flows in through either port 280 or ports 266 to insure balance. Likewise port 280 performs the function of relief in the event that unbalance occurs when the hoist plunger is at either end of its stroke, and in this case acts for the same purpose and in the manner of relief valve 72 in Figure 2.

In Figure 6, as has already been explained, the main control valve plunger is identical in construction with that in Figure 5. The only difference in this valve construction is in the flow control portion of the same. This embodiment makes use of a spool valve instead of a hollow flow control valve. It comprises a reduced center stem 282 with enlarged end land portions 283 and 284 cooperating in portions of the bore 285. The right hand portion of this bore is exposed to passage 238", permitting high pressure to act against the right hand end of the flow control valve plunger. The differential area of the left end of the land 283 is exposed in the passage 275 leading to the tank. The control land 284 at the left end of the valve substantially closes off return passage 248 when the valve is positioned as shown under the action of its spring 287, the left end of which abuts against plug 269 which also carries the limiting stop 270 controlling the amount of movement of the valve to the left. The space to the left of land 284 is connected by passage 288 to the tank.

With the control valve in the position shown, movement of the hoist in either direction causes a flow of return liquid into passage 248, which is substantially checked by land 284. This immediately causes a buildup of high pressure from the pump which acts on the end of land 283 in passage 238" and moves the plunger to the left an appropriate distance to release fluid from 248 and provide a balance between the inflowing and discharging liquids, thus holding the hoist piston against advancing more rapidly than liquid is supplied behind it. In order to prevent chattering, small longitudinal grooves 290 are provided in the right end of the land 284, but these serve a secondary purpose of preventing the valve from completely closing at any time, thereby affording flow to or from the tank under the float position of the control valve for compensating for differences in volume on the two sides of the piston of the hoist, as previously described.

Figure 7:
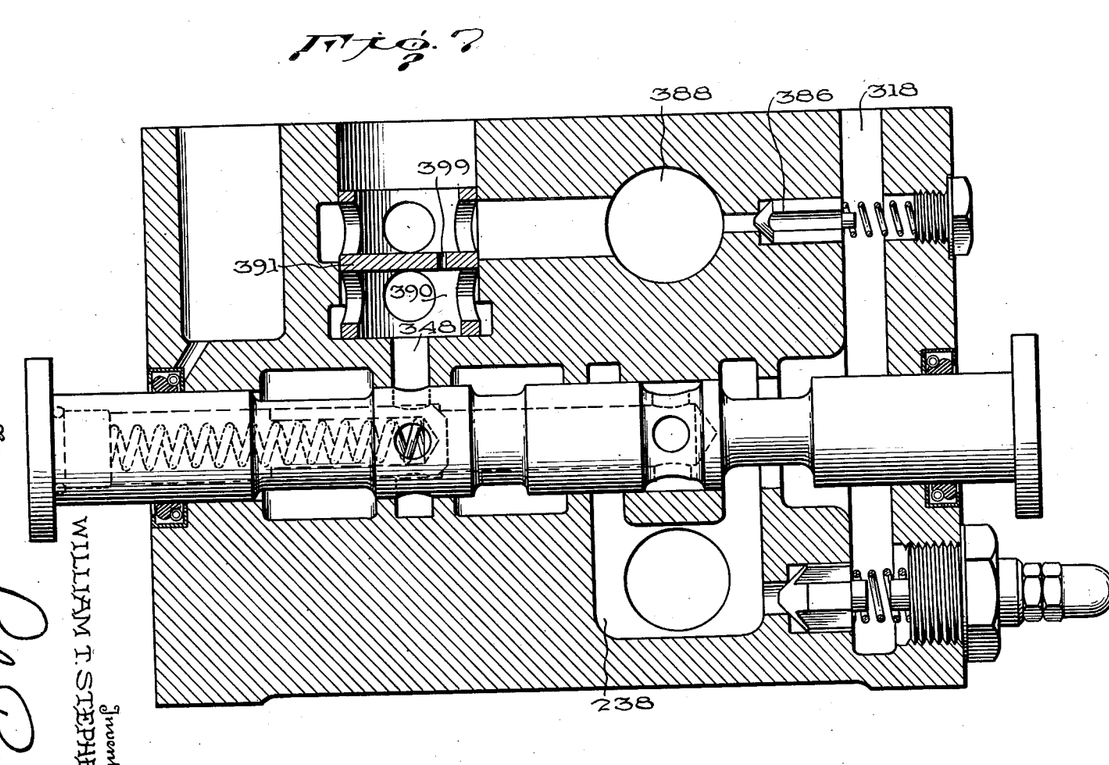
Figure 7 is a longitudinal central section through a control valve for use in a closed system of the type illustrated in Figure 3, the valve representing a simplification of the construction illustrated in Figure 4.

In Figure 7, which is adapted for use with a closed system such as shown in Figure 3, the plunger construction and intersecting passages in the hoist are the same as in Figure 5 except that the secondary portion 238" of the high pressure chamber 238 is not so long since it does not have to provide compensation for a flow control valve.

The portion of the main control plunger for operating the hoist in any of its desired conditions is identical to those portions already described in connection with the other figures. In keeping with Figure 4 this figure provides a low pressure return port 388 for connection to the pump inlet and this port is vented through a low pressure relief valve 386 to the passage 318 leading to the tank. This valve construction in common with that of Figure 4 provides the valve 390 in the return flow passage 348 from the hoist. Its operation is exactly the same as that described for the valve in Figure 4 of the corresponding member and it is not necessary to define its operation here. It should be noted, however, that this figure in keeping with Figures 5 and 6 does not provide the longitudinal grooves 75, 175, as extensions of the grooves 43, 143, in the main valve plunger, so that other means must be provided for compensating for the volume differential on the two sides of the hoist piston in the float position. In Figure 7 this is effected by a small bleeder passage 399 through the partition 391 in valve 390. It should be remembered in connection with the description of the operation of Figure 4 that excess liquid coming from the larger volumed side of the hoist piston must be forced out by way of low pressure relief valve 86. The same construction is provided in Figure 7, where the valve is numbered 386. This valve however may be omitted and the bleeder port 399 relied on to provide the relief as well as the supply of additional liquid.

In all of the valves it will be noted that the packing at the right hand end of the main control valve has interposed between it and any source of high pressure fluid, a low pressure chamber which prevents putting this packing under any considerable pressure, and it is therefore insured against leakage. At the opposite end, however, the packing is closely adjacent the hoisting port 47, which at times is filled with high pressure liquid. Any seepage along the valve to the left hand packing is permitted to vent to the tank in Figure 2 through passage 40' connected to the passage 24 leading to the tank. Corresponding drain passages are provided in each of the constructions as clearly illustrated and prevent high pressure liquid acting on the packings.

Each of the valves as just described provides for complete manual control of the hoist for operating a bulldozer or other device under all conditions of lifting and lowering and positively insures against the hoist taking control away from the operator on the lowering operation and dropping at an undesired speed. Each of the systems provided for full circulation of the oil between the pump and the tank in the neutral position of the valve where it remains for the largest portion of time during the operation of any hydraulically controlled earth-moving equipment. Adequate cooling is thereby insured. There is but little difference in the effectiveness of the control with the open or the closed system, but both are provided since each has its adherents among the manufacturers of machinery using hydraulic control.

I claim:

1. A control valve for use in a hydraulic system composed of a double acting hoist, a reservoir and a positive displacement pump, comprising a valve housing having a bore, a reciprocable plunger adapted to be moved successively in said bore to the following positions in said bore, "raise," "hold," "lower" and "float," said plunger having a plurality of circumferential grooves and intermediate and end lands, a longitudinal bore in said plunger connecting one of said grooves to a port in one of said lands, a single check valve in said bore and opening toward said port, said housing having a plurality of passages intersecting said bore for selective cooperation with said plunger grooves and port, one of said passages being adapted to connection to the high pressure side of the pump, two of said passages being adapted respectively for connection to opposite ends of the hoist, and a return fluid passage intermediate said hoist passages arranged to return fluid from the hoist for reuse by the pump.

2. A control valve for use in a hydraulic system composed of a double acting hoist, a reservoir and a positive displacement pump, comprising a valve housing having a bore, a reciprocable plunger movable in said bore to "raise," "hold," "lower" and "float" positions, said plunger having lands and intermediate grooves, spaced ports through said plunger, a longitudinal bore in said plunger connecting said ports, a check valve in said plunger bore between said ports, said housing having a plurality of passages intersecting said first bore for selective cooperation with said plunger grooves and ports, one of said passages being adapted for connection to the pump outlet, two of said passages being adapted respectively for connection to opposite ends of the hoist, a return fluid passage intermediate said hoist passages arranged to return fluid from the hoist for reuse by the pump, a return passage to the reservoir adjacent the said first mentioned passage and adapted to be connected thereto by one of said grooves when the plunger is in the "hold" position, the entrance port of said plunger bore being in register with the pump outlet passage whenever the valve plunger is in "raise" or "lower" position, and a land on said plunger to prevent communication between the pump outlet passage and the return passage to the reservoir.

3. A control valve for use in a hydraulic system composed of a double acting hoist, a tank and a positive displacement pump, comprising a valve housing having a bore, a reciprocable plunger movable in said bore to "raise," "hold," "lower" and "float" positions, said plunger having lands and intermediate grooves, spaced inlet and outlet ports through said plunger, a longitudinal bore in said plunger connecting said ports, a check valve in said plunger bore between said ports, said housing having a plurality of passages intersecting said first bore for selective cooperation with said plunger grooves and ports, one of said passages being adapted for connection to the pump outlet, two of said passages being adapted respectively for connection to opposite ends of the hoist, a return fluid passage intermediate said hoist passages arranged to return fluid from the hoist to the tank, a second return passage to the tank adjacent the said first mentioned passage and adapted to be connected thereto by one of said grooves when the plunger is in the "hold" position, a flow control valve in the first return fluid passage to regulate the rate of fluid return from the hoist, and means to actuate said valve subjected directly to the pressure in said first mentioned passage and in the return fluid passage.

4. A control valve for use in a hydraulic system composed of a double acting hoist, a tank and a positive displacement pump, comprising a valve housing having a bore, a reciprocable plunger movable in said bore to "raise," "hold," "lower" and "float" positions, said plunger having lands and intermediate grooves, spaced inlet and outlet ports through said plunger, a longitudinal bore in said plunger connecting said ports, a check valve in said plunger bore between said ports, said housing having a plurality of passages intersecting said first bore for selective cooperation with said plunger grooves and ports, one of said passages being adapted for connection to the pump outlet, two of said passages being adapted respectively for connection to opposite ends of the hoist, a return fluid passage intermediate said hoist passages arranged to return fluid from the hoist to the tank, a second return passage to the tank adjacent the said first mentioned passage and adapted to be connected thereto by one of said grooves when the plunger is in the "hold" position, a flow control valve in the first return fluid passage to regulate the rate of fluid return from the hoist, means to bias said flow control valve toward closed position and means directly subjected to the pressure in said first passage to urge said flow control valve toward open position.

5. A control valve for use in a hydraulic system composed of a double acting hoist, a reservoir and a positive displacement pump, comprising a valve housing having a bore, a reciprocable hollow plunger movable in said bore to "raise," "hold," "lower" and "float" positions, said plunger having lands and intermediate grooves, spaced inlet and outlet ports through the plunger wall, a check valve in the hollow of said plunger between said ports, said housing having a plurality of passages intersecting said first bore for selective cooperation with said plunger grooves and ports, one of said passages being adapted for connection to the pump outlet and registering with said inlet port on "raise" and "lower" settings, two of said passages being adapted respectively for connection to opposite ends of the hoist and correspondingly cooperating with the plunger outlet port on "raise" and "lower" settings, a return fluid passage intermediate said hoist passages arranged to return fluid from the hoist for reuse by the pump and selectively connected through a plunger groove to one of said two hoist passages on "raise" or "lower" settings.

6. A control valve for use in a hydraulic system composed of a double acting hoist, a reservoir and a positive displacement pump, comprising a valve housing having a bore, a reciprocable hollow plunger movable in said bore to "raise," "hold," "lower," and "float" positions, said plunger having lands and intermediate grooves, spaced inlet and outlet ports through the plunger wall, a check valve in the hollow of said plunger between said ports, said housing having a plurality of passages intersecting said first bore for selective cooperation with said plunger grooves and ports, one of said passages being adapted for connection to the pump outlet and registering with said inlet port on "raise" and "lower" settings, two of said passages being adapted respectively for connection to opposite ends of the hoist and correspondingly cooperating with the plunger outlet port on "raise" and "lower" settings, a return fluid passage intermediate said hoist passages arranged to return fluid from the hoist for reuse by the pump and selectively connected through a plunger groove to one of said two hoist passages on "raise" or "lower" settings, and a pressure actuated flow control valve having a plunger arranged in said return fluid passage, said plunger having an actuating area exposed in the pump outlet passage of the housing.

7. A control valve for use in a hydraulic system composed of a double acting hoist, a reservoir and a positive displacement pump, comprising a valve housing having a bore, a reciprocable hollow plunger movable in said bore to "raise," "hold," "lower" and "float" positions, said plunger having lands and intermediate grooves, spaced inlet and outlet ports through the plunger wall, a check valve in the hollow of said plunger between said ports, said housing having a plurality of passages intersecting said first bore for selective cooperation with said plunger grooves and ports, one of said passages being adapted for connection to the pump outlet and registering with said inlet port on "raise" and "lower" settings, two of said passages being adapted respectively for connection to opposite ends of the hoist and correspondingly cooperating with the plunger outlet port on "raise" and "lower" settings, a return fluid passage intermediate said hoist passages arranged to return fluid from the hoist to the reservoir and selectively connected through a plunger groove to one of said two hoist passages on "raise" or "lower" settings, a pressure-actuated flow control valve forming a part of said return fluid passage and having a reciprocable plunger with an actuating area subjected directly to pressure in the pump outlet passage, pressure on said area tending to open the return fluid passage, and means to prevent full closure of said flow control valve at any time.

8. A control valve for use in a hydraulic system composed of a double acting hoist having a piston, a reservoir and a positive displacement pump, comprising a valve housing having a bore, a reciprocable hollow plunger movable in said bore to "raise," "hold," "lower" and "float" positions, said plunger having lands and intermediate grooves, spaced inlet and outlet ports through the plunger wall, a check valve in said plunger between said ports, said housing having a plurality of passages intersecting said first bore for selective cooperation with said plunger grooves and ports, one of said passages being adapted for connection to the pump outlet and effectively registering with the said inlet port only on "raise" and "lower" settings, two of said passages being adapted respectively for connection to opposite ends of the hoist and selectively connected to the outlet port in the plunger on "raise" and "lower" settings, a return fluid passage intermediate said hoist passages arranged to be connected through a plunger groove to one of said hoist passages on "raise" or "lower" settings, a return passage to the reservoir adjacent the said first mentioned passage and adapted to be connected thereto by one of said grooves when the plunger is in the "hold" position, lands on said plunger being positioned to separate the last two mentioned passages when the plunger is in the "raise" or "lower" position.

9. A control valve for use in a hydraulic system composed of a double acting hoist having a piston, a reservoir and a positive displacement pump, comprising a valve housing having a bore, a reciprocable hollow plunger movable in said bore to "raise," "hold," "lower" and "float" positions, said plunger having lands and intermediate grooves, spaced inlet and outlet ports through the plunger wall, a check valve in said plunger between said ports, said housing having a plurality of passages intersecting said first bore for selective cooperation with said plunger grooves and ports, one of said passages being adapted for connection to the pump outlet and effectively registering with the said inlet port only on "raise" and "lower" settings, two of said passages being adapted respectively for connection to opposite ends of the hoist and selectively connected to the outlet port in the plunger on "raise" and "lower" settings, a return fluid passage intermediate said hoist passages arranged to be connected through a plunger groove to one of said hoist passages on "raise" or "lower" settings, and a return passage to the reservoir adjacent the said first mentioned passage and adapted to be connected thereto by one of said grooves when the plunger is in the "hold" position, certain lands on said plunger being positioned to separate the last two mentioned passages when the plunger is in the "raise" or "lower" position.

10. A control valve for use in a hydraulic system composed of a double acting piston and rod type hoist, a reservoir and a positive displacement pump, comprising a valve housing having a bore, a reciprocable plunger movable in said bore to "raise," "hold," "lower" and "float" positions, said plunger having lands and intermediate grooves, a longitudinal bore in said plunger, spaced ports through the plunger at opposite ends of the said longitudinal bore, a check valve in said plunger bore between said ports, said housing having a plurality of passages intersecting said first bore for selective cooperation with said plunger grooves and ports, one of said passages being adapted for connection to the pump outlet, two of said passages being adapted respectively for connection to opposite ends of the hoist, a return fluid passage intermediate said hoist passages arranged to return fluid from the hoist for reuse by the pump, a return passage to the reservoir adjacent the said first mentioned passage and adapted to be connected thereto by one of said grooves when the plunger is in the "hold" and "float" positions, one of said plunger grooves being arranged to span the hoist passages to connect them together in the "float" position.

11. A control valve for use in a hydraulic system composed of a double acting piston and rod type hoist, a reservoir and a positive displacement pump, comprising a valve housing having a bore, a reciprocable plunger movable in said bore to "raise," "hold," "lower" and "float" positions, said plunger having lands and intermediate grooves, a longitudinal bore in said plunger, spaced ports through the plunger at opposite ends of the said longitudinal bore, a check valve in said plunger bore between said ports, said housing having a plurality of passages intersecting said first bore for selective cooperation with said plunger grooves and ports, one of said passages being adapted for connection to the pump outlet, two of said passages being adapted respectively for connection to opposite ends of the hoist, a return fluid passage intermediate said hoist passages arranged to return fluid from the hoist for reuse by the pump, a return passage to the reservoir adjacent the said first mentioned passage and adapted to be connected thereto by one of said grooves when the plunger is in the "hold" and "float" positions, one of said plunger grooves being arranged to span the hoist passages to connect them together in the "float" position, and another of said plunger grooves being arranged to provide a limited connection between one of said hoist passages and the connected pump outlet and return passage on "float" to accommodate liquid differential on the two sides of the hoist piston.

12. A control valve for use in a hydraulic system composed of a double acting piston and rod type hoist, a reservoir and a positive displacement pump, comprising a valve housing having a bore, a reciprocable plunger movable in said bore to "raise," "hold," "lower" and "float" positions, said plunger having lands and intermediate grooves, a longitudinal bore in said plunger, spaced ports through the plunger at opposite ends of the said longitudinal bore, a check valve in said plunger bore between said ports, said housing having a plurality of passages intersecting said first bore for selective cooperation with said plunger grooves and ports, one of said passages being adapted for connection to the pump outlet, two of said passages being adapted respectively for connection to opposite ends of the hoist, a return fluid passage intermediate said hoist passages arranged to return fluid from the hoist for reuse by the pump, a return passage to the reservoir adjacent the said first mentioned passage and adapted to be connected thereto by one of said grooves when the plunger is in the "hold" and "float" positions, one of said plunger grooves being arranged to span the hoist passages to connect them together in the "float" position, and means to provide or waste liquid needed to balance the differential volumes at the two sides of the hoist piston during "float."

13. In a hydraulic system comprising a double acting hoist, a reservoir, a positive displacement pump and a manual control valve connected into an "open system," the combination therewith of a flow control valve for restricting movement of the hoist to the rate determined by the supply of liquid thereto, said flow control valve including a housing having a bore, a piston reciprocable in said bore, valve means actuated by said piston to regulate the flow of the liquid returning to said reservoir from the hoist one end of the bore being connect to expose the valve opening piston end to the pressure developed by said pump in moving the hoist, means subjecting an area of the piston opposed to said end to the pressure of the liquid returning from the hoist, whereby the rate of liquid discharged by the hoist is regulated to correspond to that of the liquid supplied to it.

14. In a hydraulic system comprising a double acting hoist, a reservoir, a positive displacement pump and a manual control valve connected into an "open system," the combination therewith of a flow control valve for limiting movement of the hoist by its load to the rate effected by the supply of actuating liquid thereto, said flow control valve including a housing having a bore, a piston reciprocable in said bore, one end of the bore being connected to the pump outlet to bias the piston in accordance with the pressure developed to move the hoist, means subjecting an opposed area of the piston to the pressure of the liquid returning from the opposite end of the hoist, valve means actuated by said piston to prevent flow of the returning liquid to said reservoir when the latter pressure predominates and to permit flow when the former pressure predominates.

15. In a hydraulic system comprising a double acting hoist, a reservoir, a positive displacement pump and a manual control valve connected into an "open system," the combination therewith of a flow control valve for preventing movement of the hoist by its load, said flow control valve including a housing having a bore, a piston reciprocable in said bore, one end of the bore being connected to expose the corresponding piston end to the pressure developed by said pump to move the hoist, means subjecting an area of the piston opposed to said end to the pressure of the liquid returning from the hoist, valve means between the piston and reservoir to regulate the flow of the returning liquid to said reservoir, said piston being connected to move said valve toward open position under the action of said pump pressure and vice versa.

16. In a hydraulic system comprising a double acting hoist, a reservoir, a positive displacement pump and a manual control valve connected into an "open system," the combination therewith of a flow control valve for limiting movement of the hoist by its load to the rate determined by the supply of actuating liquid thereto, said flow control valve including a housing having a bore, a piston reciprocable in said bore and having a recess opening from one end thereof, one end of the bore being connected to expose the closed piston end to the pressure developed by said pump in moving the hoist, a plug having a sliding fit in said recess, an abutment in said bore for said plug, a port in the wall of said piston, a passage always communicating with said port and connected to return all liquid from the hoist, a passage to the reservoir and a second port in said piston variably exposed to said last mentioned passage depending upon the position of the piston to regulate the rate of return of liquid from the hoist.

17. The control valve assembly as defined in claim 4 in which the means for biasing the flow control valve includes fluid pressure.

WILLIAM T. STEPHENS.

REFERENCES CITED

The following references are of record in the file of this patent:

UNITED STATES PATENTS

| Number | Name | Date |
| --- | --- | --- |
| 679,533 | Moore | July 30, 1901 |
| 1,225,699 | Brown | May 8, 1917 |
| 1,545,302 | Bring | July 7, 1925 |
| 1,955,154 | Temple | Apr. 17, 1934 |
| 1,970,181 | Monroe | Aug. 14, 1934 |
| 1,972,462 | Schafer | Sept. 4, 1934 |
| 2,175,152 | Hey | Oct. 3, 1939 |
| 2,202,216 | Madsen | May 28, 1940 |
| 2,215,115 | Buffington | Sept. 17, 1940 |
| 2,335,305 | Parsons | Nov. 30, 1943 |
| 2,359,802 | Stephens | Oct. 10, 1944 |
| 2,362,945 | Stephens | Nov. 14, 1944 |
| 2,377,278 | Stephens | May 29, 1945 |

FOREIGN PATENTS

| Number | Country | Date |
| --- | --- | --- |
| 179,854 | Great Britain | 1922 |
| 373,732 | Great Britain | 1932 |